US011550918B2

(12) United States Patent
Schack

(10) Patent No.: US 11,550,918 B2
(45) Date of Patent: Jan. 10, 2023

(54) PACKAGE-BASED REMOTE FIRMWARE UPDATE

(71) Applicant: Landis+Gyr Innovations, Inc., Alpharetta, GA (US)

(72) Inventor: August W. Schack, Brainerd, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 456 days.

(21) Appl. No.: 16/712,310

(22) Filed: Dec. 12, 2019

(65) Prior Publication Data

US 2021/0182398 A1 Jun. 17, 2021

(51) Int. Cl.
*G06F 21/57* (2013.01)
*G06F 16/21* (2019.01)
(Continued)

(52) U.S. Cl.
CPC .............. *G06F 21/572* (2013.01); *G06F 8/63* (2013.01); *G06F 8/65* (2013.01); *G06F 16/217* (2019.01);
(Continued)

(58) Field of Classification Search
CPC . G06F 21/572; G06F 8/63; G06F 8/65; G06F 16/217; G06F 21/64;
(Continued)

(56) References Cited

U.S. PATENT DOCUMENTS

2002/0116485 A1* 8/2002 Black ................... H04L 41/344
709/227
2012/0026005 A1* 2/2012 Myoung ................. H04Q 9/00
340/870.02

(Continued)

OTHER PUBLICATIONS

Kolehmainen, "Security of Firmware Update Mechanisms Within SOHO Routers", Master's Thesis in Information Technology, University of Jyväsky lä, available at URL:https://ivx.iyu.fi/bitstream/handle/123456789/64101/URN:NBN:fi:jyu-201905222704.pdf?sequence=l&isAllowed=y (XP055783314), May 14, 2019, pp. 1-66.

(Continued)

*Primary Examiner* — Quazi Farooqui
(74) *Attorney, Agent, or Firm* — Kilpatrick Townsend & Stockton LLP

(57) ABSTRACT

A method for updating firmware includes receiving, at a device, an updated installation package. The updated installation package includes an updated version of an installation package, which belongs to a set of installation packages stored on the device for installation of firmware on the device. The method further includes updating the set of installation packages by replacing the installation package with the updated installation package. The method further includes installing updated firmware in volatile memory of the device based on the updated set of installation packages. The method further includes storing an image of the updated firmware in nonvolatile storage of the device. Additionally, the method includes, during a boot process, loading the image from the nonvolatile memory of the device onto the volatile memory of the device, to enable running the updated firmware from the volatile memory, and verifying the authenticity of the updated firmware.

19 Claims, 6 Drawing Sheets

(51) Int. Cl.
    *G06F 21/64*         (2013.01)
    *G06F 8/65*           (2018.01)
    *G06F 8/61*           (2018.01)

(52) U.S. Cl.
    CPC ........ *G06F 21/64* (2013.01); *G06F 2221/033* (2013.01)

(58) Field of Classification Search
    CPC .. G06F 2221/033; G06F 21/575; G06F 8/654; G06F 21/57; G06F 16/21; G06F 8/61
    See application file for complete search history.

(56) References Cited

U.S. PATENT DOCUMENTS

| | | |
|---|---|---|
| 2013/0185548 A1 | 7/2013 | Djabarov et al. |
| 2014/0215456 A1* | 7/2014 | Mercier ................ H04W 24/04 |
| | | 717/175 |
| 2017/0003956 A1* | 1/2017 | Chang .................... G06F 8/658 |
| 2017/0220404 A1 | 8/2017 | Polar Seminario |
| 2019/0163502 A1 | 5/2019 | Malone et al. |

OTHER PUBLICATIONS

International Patent Application No. PCT/US2020/064516, International Search Report and Written Opinion, dated Mar. 19, 2021, 14 pages.

\* cited by examiner

PACKAGE-BASED REMOTE FIRMWARE UPDATE

TECHNICAL FIELD

Various implementations described herein relate to firmware updates and, more particularly, to firmware updates that are package-based such that firmware installation is divided into numerous combinable installation packages and, further, such that authenticity of the firmware is optionally validatable.

BACKGROUND

Firmware is a type of software that provides low-level control of a hardware device. Typically, to interact with the hardware device, a software application will communicate with the firmware, which will interact with the hardware device as needed to enable the software application to utilize the hardware device. A device's firmware may need to be updated for various reasons, such as for the installation of new features or for fixing a bug. Updating firmware of a device can be performed in various ways. For example, updated firmware can be received via a cable, such as a universal serial bus (USB) cable or an Ethernet cable. For another example, in the case of a remote firmware update, the firmware can be received wirelessly, such as over wireless fidelity (WiFi).

SUMMARY

In one implementation, a method for updating firmware includes receiving, at a device, an updated installation package. The updated installation package includes an updated version of an installation package, which belongs to a set of installation packages stored on the device for installation of firmware on the device. The method further includes updating the set of installation packages by replacing, in the set of installation packages stored on the device, the installation package with the updated installation package. The method further includes installing updated firmware in volatile memory of the device based on the updated set of installation packages including the updated installation package. The method further includes storing an image of the updated firmware in nonvolatile storage of the device. Additionally, the method includes, during a boot process, loading the image of the updated firmware from the nonvolatile memory of the device onto the volatile memory of the device, to enable running the updated firmware from the volatile memory, and attempting to verify the authenticity of the updated firmware.

In another implementation, a system includes a server, which includes a processor and a memory. The processor is configured to execute computer-readable instructions, and the memory is configured to store the computer-readable instructions that, when executed by the processor, cause the processor to perform operations. Such operations include identifying an updated installation package and inserting the updated installation package into a set of installation packages to replace an existing version of the updated installation package. The operations further include installing the set of installation packages, including the updated installation package, to generate a reference firmware. The operations further include generating a signed validation hash based on the reference firmware and providing the updated installation package and the signed validation hash to one or more nodes remote from the server. The one or more nodes utilize the updated installation package to update the one or more nodes.

In yet another implementation, a method for updating a filesystem includes receiving, at a device, an updated installation package. The updated installation package includes an updated version of an installation package, where the installation package belongs to a set of installation packages stored on the device for installation of a filesystem on the device. The method further includes receiving a signed validation hash associated with the filesystem. The method further includes updating the set of installation packages by replacing, in the set of installation packages stored on the device, the installation package with the updated installation package. The method further includes installing an updated filesystem in volatile memory of the device based on the updated set of installation packages, including the updated installation package, and validating the updated filesystem by comparing a hash of the updated filesystem to the signed validation hash. The method further includes storing an image of the updated filesystem in nonvolatile storage of the device. Additionally, the method includes, during a boot of the device, loading the image of the updated filesystem from the nonvolatile memory of the device onto the volatile memory of the device, to enable running the updated filesystem from the volatile memory, and attempting to revalidate the updated filesystem by comparing an updated hash of the updated filesystem to the signed validation hash.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
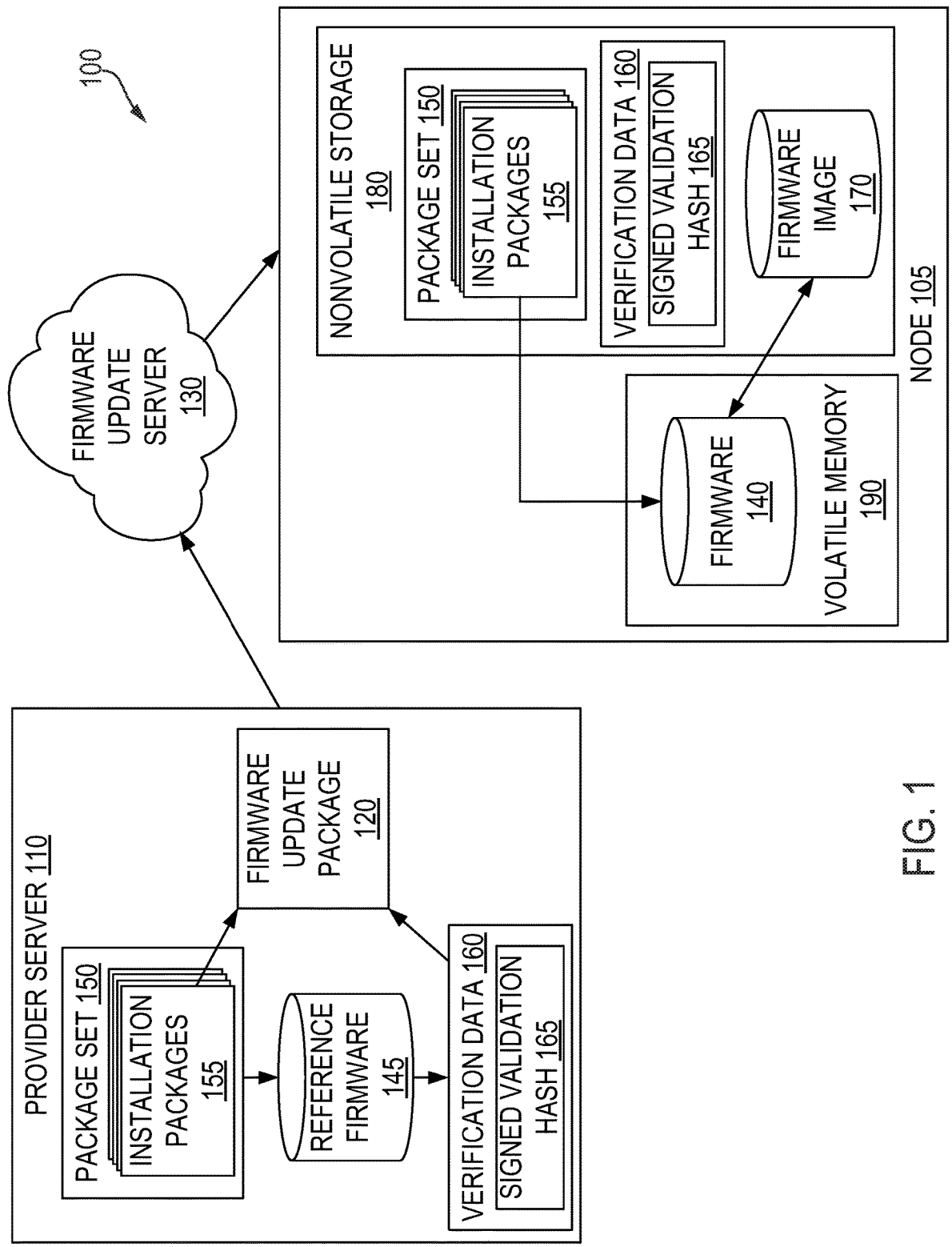
FIG. 1 is a diagram of an update system for updating firmware installed on one or more nodes, according to some implementations described herein.

Because firmware typically has low-level access to hardware, firmware is a likely target for attackers seeking to misuse a device. A filesystem, which can be implemented as firmware, controls how data is stored on a storage device and retrieved from the storage device. An authentic and uncorrupted filesystem can prevent tampering on the entire device. To guard against malicious attacks, filesystems are often signed for validation purposes. Typically, a filesystem image (i.e., an image of a filesystem) is generated and signed remotely, and the entire signed filesystem image is downloaded wirelessly to a device for a firmware update. Based on the signature, the device can ensure that the filesystem is authentic and uncompromised and can thus utilize the filesystem as is.

However, a signed image of a filesystem can be a large amount of data, and thus, transmitting a signed filesystem image from a remote server to a device requiring an update can be expensive in terms of time and network utilization. If a network over which a filesystem image, or other firmware, is being transmitted is lossy or slow, the transmission can be slow or prone to errors. Further, in a network with limited bandwidth, the transmission can utilize too much bandwidth, which can cause other transmissions over the network to be slow or to fail. As such, it is desirable to reduce the amount of data required to update a filesystem or other firmware, so as to more efficiently provide such updates and to reduce the bandwidth utilized by such updates.

An option for addressing this issue is to divide an installation file for the filesystem into a set of installation packages. In that case, when an update is required, the remote server transmits to the device only the installation packages that require updating to enable installation of an updated version of the filesystem or other firmware. The device can add such installation packages to those already stored on the device and use the resulting combination of installation packages to install the updated version of the filesystem or other firmware. However, this technique has the drawback of losing the ability to verify the authenticity of the filesystem as a whole, because a signed version of the filesystem image, as updated, is not provided for each update.

Another option is to sign each installation package such that each installation package is verifiable, leading to a resulting filesystem that can be presumed to be valid (i.e., authentic and thus uncompromised). However, this technique comes with a significant drawback for a device that runs the filesystem from volatile memory; for instance, the filesystem may be random-access memory (RAM)-based. A memory-based filesystem (e.g., RAM-based) might be used for various reasons. In some cases, for instance, a memory-based filesystem can be multiple times faster with respect to read and write performance than a filesystem based in nonvolatile memory. Because volatile memory does not retain data when power is lost, in the case of such a device, each reboot of the device results in the filesystem being erased. Thus, at each reboot, the installation packages are revalidated, and the filesystem is reinstalled. Installation typically requires decompression of the installation files as well as copying data into place in the volatile memory, and those operations are performed in addition to the act of validating each installation package prior to or during the installation itself.

In some cases, validating installation packages and reinstalling the filesystem can take a significant period of time (e.g., minutes), during which the device is unavailable. For instance, suppose the device is a utility meter configured to measure a resource for billing purposes. If the utility meter requires a reboot after being serviced or for some other reason, the filesystem would need to be reinstalled during the boot process, during which time no resource measurement could take place for a span of minutes, and a service provider thus might be unable to bill accurately for usage during that time. For another example, during the boot process, a communication relay device of the utility meter would be unable to send or receive data for a span of minutes, which could cause a loss of data being transmitted. Thus, it would be desirable to reduce the boot time of the device (e.g., the utility meter) by avoiding installing the filesystem during the boot process.

According to some implementations described in this disclosure, a provider server tasked with updating firmware on one or more nodes maintains a set of installation packages corresponding to the current version of the firmware, such as a filesystem on the nodes. To provide an update to the firmware, the provider server identifies an updated installation package. The updated installation package is an updated version of an old (e.g., obsolete or superseded) installation package, also referred to herein as a current installation package, that is currently included in the set of installation packages. The provider server updates the set of installation packages by replacing the old installation package with the updated installation package, such that the updated set of installation packages now corresponds to an updated version of the firmware. The provider server generates a reference firmware, which may be an image of the updated version of the firmware. The provider server generates a signed validation hash based on the reference firmware and transmits the updated installation packages and the signed validation hash to each node to be updated. A node receives the updated installation package and the signed validation hash. In a local set of installation packages, which is the node's copy of the set of installation packages, the node replaces the old installation package with the updated installation package and installs the updated version of firmware based on the set of installation packages as updated. The node validates (i.e., verifies the authenticity of) the firmware by hashing the updated version and comparing the resulting hash to the signed validation hash. The node saves an image of the updated firmware in nonvolatile storage such that the image will survive powering down, such as in the case of a boot or reboot of the node. Further, upon booting (e.g., rebooting), rather than reinstall the updated firmware, the device copies the image of the firmware to the volatile memory where the firmware was installed. Again, the node validates the updated firmware by hashing the updated firmware and comparing the result to the signed validation hash.

Implementations described herein have advantages over existing techniques of updating firmware, particularly in the case of updating a filesystem configured to run from volatile memory. For instance, implementations described herein enable firmware to be updated as a result of transmitting an updated installation package, rather than transmitting an entire filesystem image. Thus, a remote firmware update requires reduced bandwidth given that an updated installation package is likely to be much smaller than a filesystem image. Further, implementations described herein enable firmware to be validated based on a reference image, such as reference firmware that is stored remotely, that is known to be authentic and uncompromised. As a result, even when firmware runs from volatile memory, the firmware need not be reinstalled upon a boot of the node because a signed validation hash or other form of verification data is provided based on the reference firmware. The device can thus create the firmware only a single time, such that booting the node requires revalidation but not reinstallation, and validation of firmware is typically much faster than reinstallation. Thus, some implementations enable efficient installation that reduces network utilization while also keeping boot time relatively low.

FIG. 1 is a diagram of an update system 100 for updating firmware installed on one or more nodes 105, according to some implementations described herein. As shown in FIG. 1, the update system 100 is integrated into a provider server 110 and is further integrated into one or more nodes 105 located remotely from the provider server 110. In some implementations, the provider server 110 is in communication with a node 105 either directly or indirectly, such as via wireless communication such as wireless fidelity (WiFi) or Bluetooth, via a wired connection, or via a combination of networks that may include wired networks, wireless networks, or both. For instance, the wireless communication may be via radio over a wireless mesh network, in which case one or both of the provider server 110 and the nodes 105 include a respective radio. In one implementation, to update the firmware on a node 105, the provider server 110 provides a firmware update package 120 to a firmware update server 130, where the firmware update server 130 includes a radio, which is connected to a wireless mesh network of which the node 105 is a part. The node 105 thus downloads the firmware update package 120 from the firmware update server 130 over the wireless mesh network, for instance, using radio communication. In another implementation, however, the node 105 downloads the firmware update package 120 from the firmware update server 130 using some other communication technique, such as WiFi, Bluetooth, or a wired connection. It will be understood that the firmware update server 130 may be connected to the node 105 and may thus communicate with the node 105 through one or more of various networks, which may be wired, wireless, or a combination of both.

Each of the provider server 110, the nodes 105, and the firmware update server 130 may be implemented as hardware, software, or a combination of hardware and software. In one implementation, for instance, each node 105 is a computing device, such as a utility meter, and the provider server 110 is implemented as one or more computing devices remote from the nodes 105 or is a server application running on a computing device remote from the nodes 105. Analogously, the firmware update server 130 may be one or more computing devices or a server application running on one or more computing devices. In some implementations, the provider server 110 and the firmware update server 130 run on a common computing device or set of computing devices and, thus, need not be distinct devices; alternatively, however, the provider server 110 and the firmware update server 130 may be implemented as distinct components. For instance, the firmware update server 130 may provide cloud services of receiving firmware updated packages 120 from one or more provider servers 110 and of transmitting firmware update packages 120 to one or more nodes 105.

In some implementations, the provider server 110 may be configured to generate or otherwise provide firmware update packages 120 corresponding to various versions and types of firmware. Thus, it will be understood that techniques described herein for providing a firmware update package 120 can be performed by the provider server 110 for various different firmware 140. In one implementation, however, the provider server 110 provides firmware update packages 120 for a certain type of node 105 (e.g., utility meters), for a certain type of firmware 140 (e.g., filesystems for use by certain utility meters), or for a certain manufacturer of firmware 140. For instance, the provider server 110 may be owned or managed by a manufacturer or service provider, and thus, firmware update packages 120 generated by the provider server 110 may be configured to provide firmware updates from that manufacturer or service provider. Further, in some implementations, the firmware update server 130 maintains firmware update packages 120 received from various provider servers 110 and, thus, for instance, from various manufacturers or service providers. Thus, the provider server 110 may generate firmware update packages 120 for certain firmware 140, while the firmware update server 130 may deliver such firmware update packages 120 received from various provider servers 110.

In the example of FIG. 1, only a single node 105 is shown. However, it will be understood that the single node 105 is provided for illustrative purposes only and that multiple nodes 105 may be configured to update their respective firmware 140 through the update system 100. For instance, multiple nodes 105 may each be configured to download firmware update packages 120 from the firmware update server 130 or directly from the provider server 110. Further, it will be understood that the operations described herein as performed by a node 105 may be performed by each such node 105 according to some implementations.

As shown in FIG. 1, some implementations of the provider server 110 maintain various data related to a current version of firmware 140 installed on the nodes 105, or desired to be installed on the nodes 105. For instance, the provider server 110 may maintain one or more of the following: a package set 150, which is a set of installation packages 155 useable together to install the firmware 140; a reference firmware 145, which is an image of the firmware 140; and verification data 160. Specifically, an example of the provider server 110 maintains the package set 150, the reference firmware 145, and the verification data 160. Generally, in some implementations, the installation packages 155 are combinable to install the firmware 140; the reference firmware 145 is an image of the firmware 140; and the verification data 160 is useable to verify the authenticity of the firmware 140 or an image of the firmware 140, such as the reference firmware 145.

In some implementations, the package set 150 includes two or more installation packages 155 combinable to install the firmware 140. For instance, the package set 150 may be combinable to form a single, integrated installation package that is executable (e.g., expandable) to install the firmware 140. In some implementations, the provider server 110 initially gained access to the package set 150 by generating the package set 150 (e.g., by generating one or more of the individual installation packages 155). Additionally or alternatively, however, the provider server 110 received the package set 150 from a trusted source, such as from an administrator. Further additionally or alternatively, the provider server 110 received an integrated installation package and divided that integrated installation package into the package set 150. Techniques exist in the art for dividing an integrated installation package into a package set 150, and one or more of such techniques may be used in some implementations of the update system 100.

In some implementations, the reference firmware 145 is an image of the firmware 140 maintained by the provider server 110 as a reference. For instance, the provider server 110 may utilize the package set 150 to the install the firmware 140 on the provider server 110, thereby generating the reference firmware 145. As such, the reference firmware 145 is presumed to be an authentic version of the firmware 140.

The verification data 160 may be data useable to verify firmware 140, including potentially a firmware image, or to verify the package set 150, or both. In some implementations, the verification data 160 includes signed hashes, such as a set of hashes where the set as a whole is signed, or such as a set of hashes that individually signed. Each such hash may be a result of hashing an authentic version of the reference firmware 145 or of an installation package 155. For instance, the verification data 160 may include a signed validation hash 165, which may be a signed hash of the reference firmware 145, and a respective signed package hash corresponding to each installation package 155, where each such signed package hash is a signed hash of the corresponding installation package 155.

In some implementations, the provider server 110 utilizes the reference firmware 145 to generate the verification data 160. For instance, to generate a signed package hash, the provider server 110 may apply a hash function to a corresponding installation package 155 and then sign the resulting hash. Further, for instance, to generate the signed validation hash, the provider server 110 may hash the reference firmware 145, such as by applying a hash function to the reference firmware 145, and may sign the resulting hash to create the signed validation hash.

A node 105 may maintain its own local copy of various data related to the firmware 140 and, specifically, related to the version of the firmware 140 installed on the node 105. For instance, the node 105 may maintain one or more of the following (e.g., each of the following): the package set 150 corresponding to the firmware 140; a firmware image 170, which is a copy of the firmware 140 installed on the node 105; and verification data 160 useable to validate the firmware 140 or the package set 150, or both. For instance, the node 105 may maintain in its nonvolatile storage 180 each of the package set 150, the firmware image 170, and the verification data 160, such that these elements are retained in the nonvolatile storage 180 when the node 105 loses power. The nonvolatile storage 180, also referred to herein as nonvolatile memory, may be a hard disk drive, a solid-state drive, NAND flash memory, read-only memory (ROM), or another storage device that retains stored data even when powered down. Generally, the package set 150 stored on the node 105 corresponds to the version of the firmware 140 currently in use by the node 105, such that the package set 150 was used, or could have been used, to install that version of the firmware 140. In one example, if a manufacturer or service provider installed an initial version of the firmware 140 on the node 105, then that manufacturer or service provider may have also stored one or more of the package set 150, the firmware image 170, and the verification data 160 on the node 105, specifically, in the nonvolatile storage 180 on the node 105. Each time the firmware 140 is updated, as described herein, the node 105 may update this stored data, such as the package set 150, the firmware image 170, and the verification data 160, to correspond to the firmware 140 as updated.

In some implementations, the node 105 installs the firmware 140 in volatile memory 190 of the node 105. The volatile memory 190 can be, for instance, random-access memory (RAM) such that the firmware 140 is RAM-based. In that case, execution of the package set 150 causes the firmware 140 to be deployed in the volatile memory 190, such that one or more of directories, environment variables, and executables for the firmware 140 are maintained in and accessed from the volatile memory 190. In some implementations, the firmware 140 is a read-only filesystem such as SquashFS, but alternatively, the firmware 140 need not be a read-only filesystem and, further, need not be a filesystem at all. When the node 105 is rebooted, or when the node 105 otherwise loses power, the firmware 140 may be erased from the volatile memory 190, due to the volatile memory 190 being unable to retain data when powered down. Additionally or alternatively, however, the firmware 140 may be installed in the nonvolatile storage 180.

As illustrated in FIG. 1, the provider server 110 identifies an updated installation package 155, which provides an update to the firmware 140. For instance, in one example, an integrated installation package is executable to install an updated version of the firmware 140. That integrated installation package has been divided into an updated package set 150, where the updated package set 150 is the same as the package set 150 (i.e., prior to the update) except that one or more individual installation packages 155, including the updated installation package 155, have changed. In the example shown in FIG. 1, the updated installation package is an updated version of an old installation package 155 that is currently included in the package set 150. Thus, by replacing the old installation package 155 with the updated installation package 155, the package set 150 is updated and is now executable to install the updated version of the firmware 140.

Thus, the provider server 110 may install the updated package set 150 to generate an updated reference firmware 145, which is an updated image of the firmware 140. Given the updated reference firmware 145, the provider server 110 may generate an updated version of the verification data 160, such as a signed validation hash 165. The provider server 110 may transmit a firmware update package 120 to the firmware update server 130 for delivery to one or more nodes 105, where the firmware update package 120 includes the updated installation package 155 and the verification data 160. In some implementations, the verification data 160 included in the firmware update package 120 includes a signed validation hash 165 for validating the firmware 140 as well as a signed package hash corresponding to the updated installation package 155 being provided. If multiple installation packages 155 are being updated and thus provided in the firmware update package 120, then the verification data 160 may include a respective signed package hash for each such updated installation package 155.

In some implementations, a node 105 downloads the firmware update package 120, which may include an updated installation package 155 and verification data 160 as described above. The node 105 may download the firmware update package 120 from the firmware update server 130 or, such as in an implementation where no distinct firmware update server 130 is used, directly from the provider server 110. The node 105 may validate the updated installation package 155 by using the verification data 160. Further, the node 105 may execute the package set 150, as updated, to install an updated version of the firmware 140, for instance, to install the updated version of the firmware 140 in the volatile memory 190 of the node 105. The node 105 may use the verification data 160 to validate the firmware 140 and, specifically, in some implementations, may perform this validation prior to running the firmware 140. To update its package set 150 stored locally, the node 105 may replace the old installation package 155 with the updated installation package 155 in its locally stored package set 150 in the nonvolatile storage 180. Further, in the case of multiple updated installation packages 155, for each updated installation packages 155 in the firmware update package 120, the node may replace the respective old installation package 155 in the package set 150 with the updated installation package 155.

In some implementations, the firmware 140 is installed in the volatile memory 190. In that case, although the node 105 maintains a firmware image 170 in the nonvolatile storage 180, that firmware image 170 is not executable in some implementations due to not being located in the installation location, such that, for instance, references in the firmware image 170 may not necessarily point to the resources such references are expected to point to, due to the firmware image 170 not being located where it was installed in the volatile memory 190. When the node reboots, the firmware 140 is erased due to being in volatile memory 190. Thus, after a reboot, the node 105 may copy the firmware image 170 to the volatile memory 190 and, specifically, for instance, to the storage location in volatile memory 190 in which the firmware 140 was installed. As such, the firmware 140 may be executable from its installation location again. However, the node 105 may use the verification data 160 to validate the firmware 140 prior to running the firmware 140 after a reboot or other loss of power.

It will be understood that, although this disclosure refers repeatedly to operations performed by the node 105 in the instance of a reboot, such operations may additionally or alternatively be performed in the case of a boot that is not a reboot. In other words, when the node 105 is powered on after having been powered off, such operations described herein may be performed, including, for instance, copying the firmware image 170 from the nonvolatile storage 180 to the volatile memory 190 and validating the firmware 140.

Figure 2:
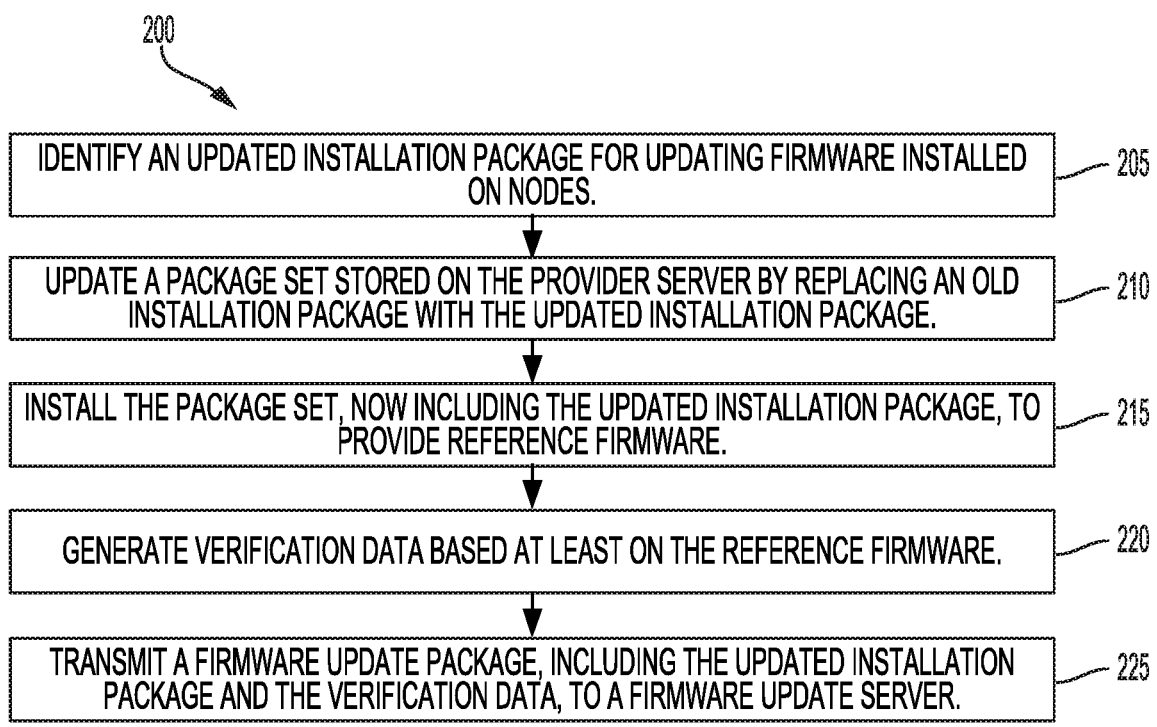
FIG. 2 depicts a method of generating a firmware update package for the one or more nodes, according to some implementations described herein.

FIG. 2 depicts a method 200 of generating a firmware update package 120 according to some implementations described herein. Specifically, the firmware update package 120 may include an updated installation package 155 and verification data 160. It will be understood that the firmware update package 120 may include multiple updated installation packages 155, each of which may be incorporated into the firmware update package 120 as described herein. In some implementations, this method 200 or similar is performed by the provider server 110 to provide the firmware update package 120 to one or more nodes 105 to enable the nodes 105 to update their respective versions of firmware 140. It will be understood that the ordering of operations illustrated in FIG. 2 and described herein is for illustrative purposes only and, further, that the blocks of FIG. 2 may be reordered, one or more blocks may be deleted, or additional blocks may be added.

As shown in FIG. 2, at block 205, the provider server 110 identifies an updated installation package 155 for updating firmware 140. In one example, the provider server 110 generates the updated installation package 155 by dividing an integrated installation package for an updated version of the firmware 140 into a package set 150 (i.e., a set of installation packages 155), such that the updated installation package 155 is a member of the set. In that case, the integrated installation package 155 may have been generated by the provider server 110 or provided to the provider server 110, such as via upload by an administrator. In another example, the provider server 110 may simply receive the updated installation package 155, such as by way of upload by an administrator. It will be understood that various techniques are available for providing the updated installation package 155 to the provider server 110.

At block 210, the provider server 110 updates the package set 150 stored on the provider server 110 by replacing an old installation package 155, of which the updated installation package is an updated version, with the updated installation package 155 in the package set 150. As such, the package set 150 has been updated to enable installation of an updated version of the firmware 140. In some implementations, regardless of whether there are one or multiple updated installation packages 155, the updated installation packages 155 may make up a subset (e.g., a proper subset) of the package set 150, such that not every installation package 155 need be updated for a firmware update to occur.

At block 215, the provider server 110 installs the package set 150, such as by executing the installation packages 155 to expand the package set 150 into the updated version of the firmware 140. The result of the installation is a reference firmware 145, which may be an image of the firmware 140, as updated.

At block 220, the provider server 110 generates verification data 160 based at least on the reference firmware 145. In some implementations, the verification data 160 includes a set of hashes signed by the provider server 110. For instance, the set of hashes may be concatenated or otherwise combined, and the combined result may be signed, or each hash may be signed individually. Specifically, the verification data 160 may include a hash of the reference firmware 145, signed to form a signed validation hash 165. In this case, to generate the signed validation hash 165, the provider server 110 may input the reference firmware 145 into a hash function and then sign the output of the hash function. In one implementation, for instance, signing is performed using the Elliptic Curve Digital Signature Algorithm (ECDSA) with a digital signature issued by the Landys+Gyr Signed Authority (LGSA), but it will be understood that other signing techniques or authorities may be used.

Further, the verification data 160 may include a signed package hash corresponding to the updated installation package 155 or may include a respective signed package hash corresponding to each installation package 155 in the updated package set 150. In some implementations signed packages hashes for the installation packages 155 not being updated have been previously generated and are stored on the provider server 110 or otherwise accessible by the provider server 110. To generate a signed package hash for an installation package, such as the updated installation package 155, the provider server 110 may hash the installation package 155 in question and may sign the resulting hash to thereby form a signed package hash corresponding to the installation package 155. Thus, the verification data 160 may be used to verify the authenticity of the firmware 140 and of each installation package 155 in the updated package set 150.

At block 225, the provider server 110 transmits a firmware update package 120 to the firmware update server 130. Additionally or alternatively, however, the provider server 110 may transmit the firmware update package 120 to one or more nodes 105 without using the firmware update server 130 as an intermediary. In either case, such transmission may, but need not, include one or more unicast transmissions. In some implementations, for instance, the provider server 110 may direct the firmware update package 120 specifically to the firmware update server 130 or to one or more nodes 105, or additionally or alternatively, the provider server 110 may broadcast or multicast the firmware update package 120, thereby enabling the firmware update server 130 or one or more nodes 105 to download the firmware update package 120.

The firmware update package 120 transmitted by the provider server 110 may include the updated installation package 155 and the verification data 160. In some implementations, the verification data 160 in the firmware update package 120 may include the signed validation hash 165 and may include a signed package hash corresponding to the updated installation packages 155, but the verification data 160 need not include the data needed to verify installation packages 155 other than the updated installation packages 155 that are being provided. For instance, if an installation package 155 is not being changed, then each node 105 may already maintain verification data 160 (e.g., signed package hashes) corresponding to such existing installation packages 155. Thus, the verification data 160 in the firmware update package 120 may include information to validate only items that are being updated, such as the updated installation package 155 and the firmware 140 itself.

Figure 3:
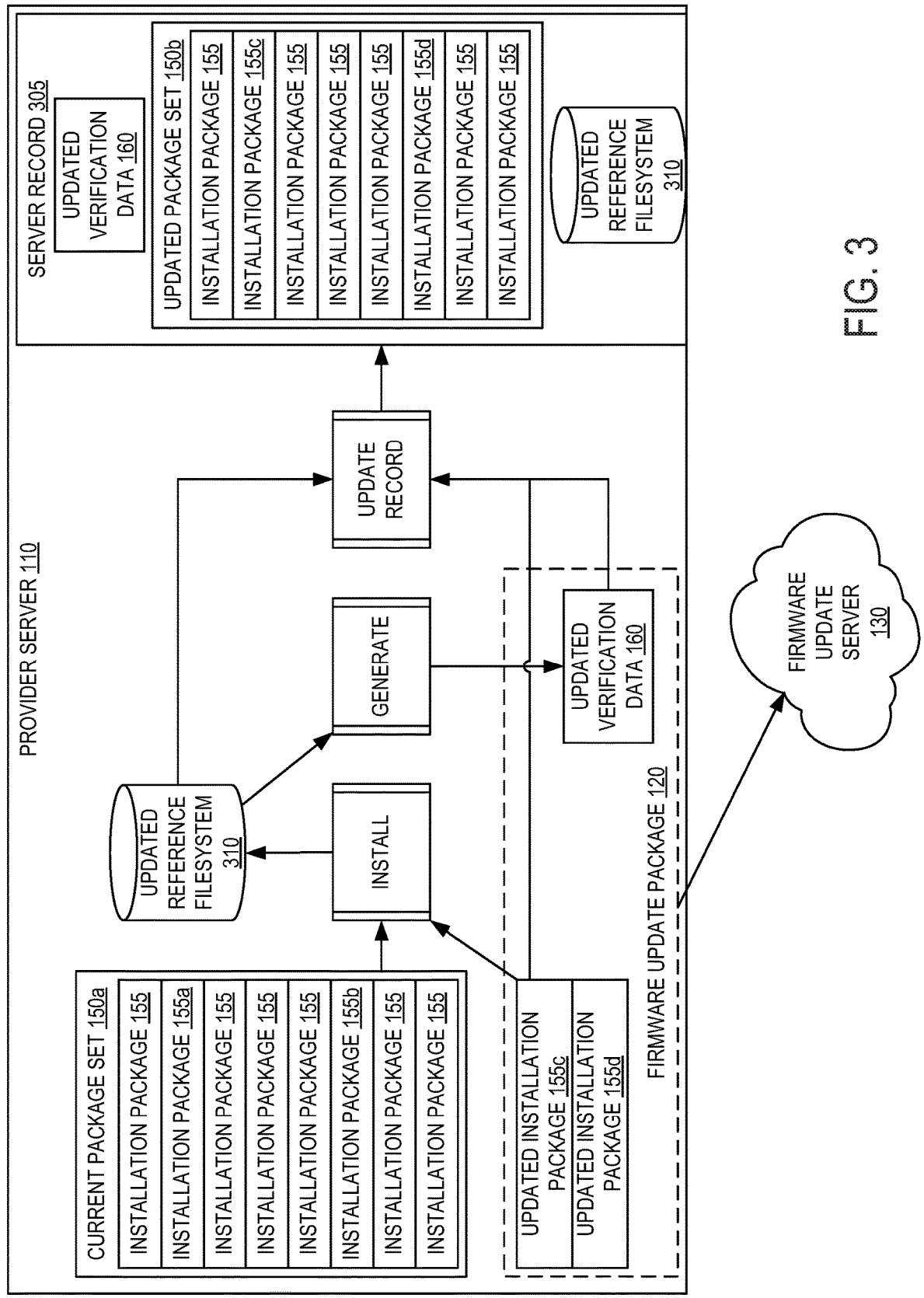
FIG. 3 depicts a communications flow of a provider server in generating the firmware update package, according to some implementations described herein.

FIG. 3 depicts a communications flow of the provider server 110 in generating a firmware update package 120, according to some implementations described herein. The description below follows this communication flow from left to right. Although the example of FIG. 3 illustrates that two installation packages 155a, 155b are being updated and that the firmware 140 being updated is a filesystem, it will be understood that these details are provided for illustrative purposes only. It will be understood that the firmware 140 need not be a filesystem and that one or multiple installation packages 155 may be updated in a firmware update package 120 configured for updating the firmware 140.

The provider server 110 may maintain a server record 305 including the current package set 150a and reference filesystem 310, where the reference filesystem 310 may be an image of the filesystem corresponding to the current package set 150a. Thus, in this example, prior to incorporating an update, the server record 305 includes a current package set 150a and a current version of the reference filesystem 310, which are in the process of being updated as shown in FIG. 3.

When updated installation packages 155c, 155d are introduced, the provider server 110 inserts the updated installation packages 155c, 155d into the current package set 150a, replacing current installation packages 155a, 155b that are the respective current versions of the updated installation packages 155c, 155d. The result is an updated package set 150b. As also shown in FIG. 3, in some implementations, the provider server 110 installs the updated package set 150b, as updated, to produce a reference filesystem 310, which may be an image of the filesystem, as updated. Based on the reference filesystem 310, the provider server 110 may generate a signed validation hash 165, or other information for validating the filesystem, for inclusion in the verification data 160. The provider server 110 may also generate a signed package hash (not shown) for inclusion in the verification data 160 to enable validation of the updated installation packages 155c, 155d. The provider server 110 may transmit to the firmware update server 130 a firmware update package 120 including the updated installation packages 155c, 155d and the signed validation hash 165.

As shown in FIG. 3, the provider server 110 may update its server record 305 based on the updated installation packages 155c, 155d and the updated verification data 160. In other words, the updated installation packages 155c, 155d may be maintained in the server record 305, specifically, in the updated package set 150b, in place of the old installation packages 155a, 155b. Further, the verification data 160 in the server record 305 may be updated by inclusion of the signed validation hash 165 as well as inclusion of a respective signed package hash for each updated installation package 155c, 155d in lieu of the signed package hash for the respective current installation package 155a, 155b.

Figure 4:
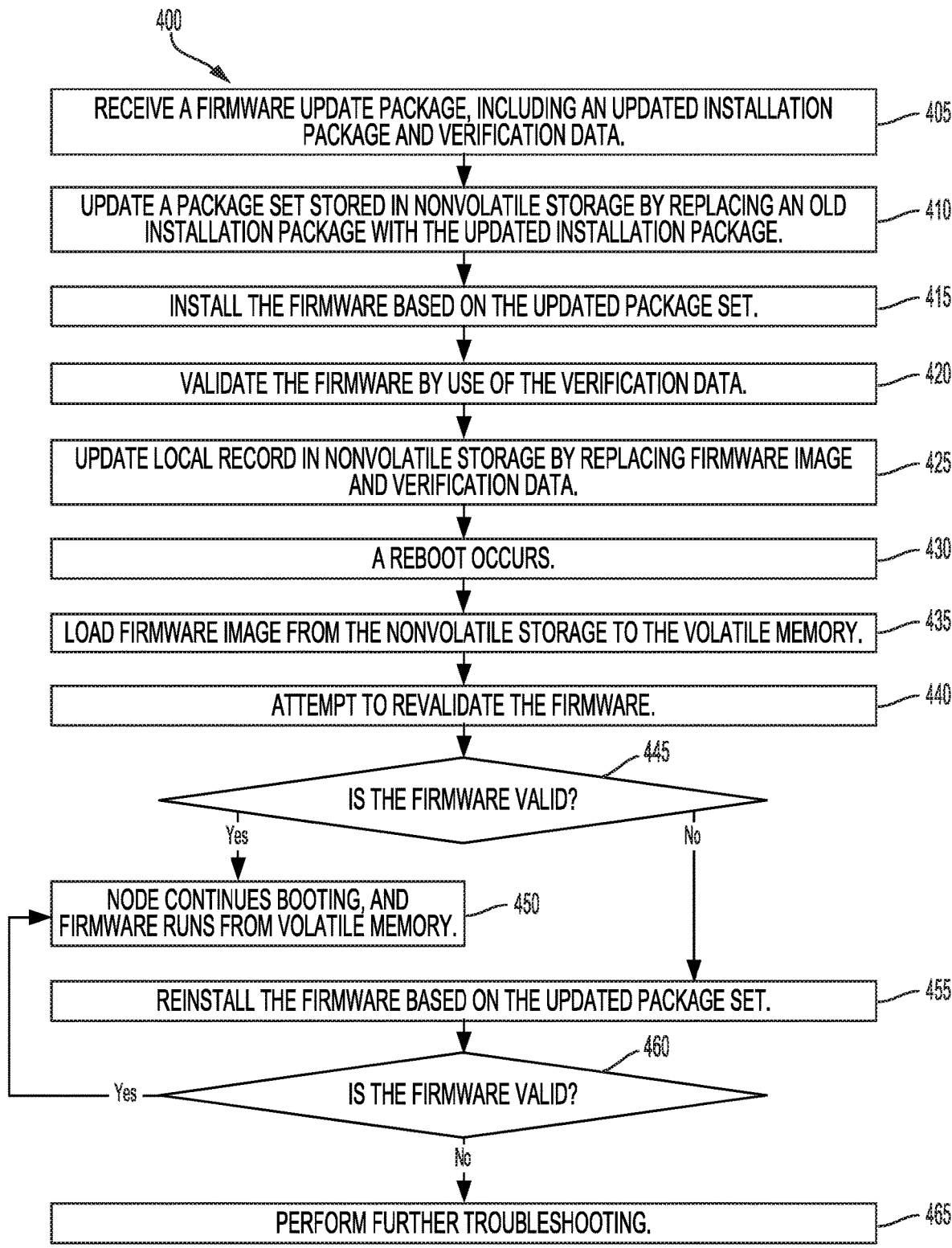
FIG. 4 depicts a method of updating firmware on a node, according to some implementations described herein.

FIG. 4 depicts a method 400 of updating firmware 140 on a node 105, according to some implementations described herein. In some implementations, this method 400 or similar is performed by a node 105 to update the firmware 140 running on the node 105. It will be understood that the ordering of operations illustrated in FIG. 4 and described herein is for illustrative purposes only and, further, that the blocks of FIG. 4 may be reordered, one or more blocks may be deleted, or additional blocks may be added.

As shown in FIG. 4, at block 405, the node 105 receives a firmware update package 120. For instance, the node 105 may receive the firmware update package 120 by downloading the firmware update package 120 directly from the provider server 110, or the node 105 may receive the firmware update package 120 indirectly from the provider server 110 by downloading the firmware update package 120 from the firmware update server 130. The firmware update package 120 may include an updated installation package 155 (e.g., potentially multiple updated installation packages 155) and verification data 160. The updated installation package 155 may be an updated version of an old installation package 155 that is included in the package set 150 currently being maintained on the node 105. The verification data 160 may include, for instance, a signed validation hash 165 to enable validation of the firmware 140 and a signed package hash for validation of the updated installation package 155.

In one example, the firmware 140 being updated is a filesystem that includes code and applications. An image of the filesystem itself can be quite large, and thus, implementations described herein can reduce network traffic by avoiding transmission of an entire filesystem image. Rather, an embodiment of the node 105 need only download verification data 160 and one or more updated installation packages 155, which are only a portion of the data needed for installation, to update its firmware 140 as described herein.

At block 410 of the method 400, the node 105 updates the package set 150 stored on the node 105 by replacing the old installation package 155 with the updated installation package 155. In some implementations, the old installation package 155 may be discarded (e.g., deleted). Alternatively, however, the old installation package 155 may be saved in case the node 105 needs to restore its firmware 140 to a prior version or for another reason. In some implementations, regardless of whether there are one or multiple updated installation packages 155, the updated installation packages 155 may make up a subset (e.g., a proper subset) of the package set 150, such that not every installation package 155 need be updated based on the firmware update package 120.

At block 415, the node 105 installs the firmware 140 based on the updated package set 150. For instance, the node 105 executes (e.g., expands or unpacks) the package set 150 to generate the executable firmware 140. The node 105 may install the firmware 140 in volatile memory 190 of the node 105, such that the firmware 140 runs from the volatile memory 190.

At block 420, the node 105 validates the firmware 140 through the use of the verification data 160. For instance, the node hashes the firmware 140 as installed on the node 105 and compares the resulting hash to the signed validation hash 165 in the verification data 160. If the hash of the firmware 140 as installed matches the signed validation hash 165, which is presumed valid due to being signed, then the node 105 deems the firmware to be valid.

In some implementations, the node 105 utilizes device-mapper-verity (dm-verity), or some other validation tool, to validate the firmware 140. The validation tool provides transparent validation as part of the boot process to ensure that the node 105 is booted with validated firmware 140. This transparent validation may include hashing the firmware 140 and comparing the resulting hash to the signed validation hash 165 in the verification data 160. When dm-verity or a similar validation tool is used, the node 105 may reboot responsive to installation of the firmware 140, and the validation of the firmware 140 may occur as part of the boot up process. It will be understood, however, that various validation techniques may be used, and reboot need not be a requirement for validation to occur.

At block 425, the node 105 updates its local record of the firmware 140. More specifically, the node 105 may store the verification data 160 (e.g., the signed validation hash as well as a signed package hash for the updated installation package 155) in the nonvolatile storage 180 of the node 105, and the node 105 may store a firmware image 170 of the firmware 140, as newly updated, in the nonvolatile storage 180 as well. Thus, when the node 105 reboots or otherwise loses power, up-to-date versions of the following are retained: the set of installation packages; the verification data 160 including information to validate the firmware 140 and optionally to validate the package set 150; and the firmware image 170.

In some implementations, if validation of the firmware 140 is performed during the boot process, then the firmware image 170 may be stored in the nonvolatile storage 180 prior to rebooting the node 105. In other words, block 425 of the method 400 may occur before block 420. In that case, the firmware image 170 may be copied back to volatile memory 190 as part of the boot process to enable validation of the firmware 140.

At some point after the update of the firmware 140 as described above, the node 105 may lose power. For instance, the node 105 may be rebooted for troubleshooting purposes or to enable servicing the node 105. At block 430 of the method 400, such a reboot of the node 105 occurs. At block 435, responsive to the reboot, the node 105 loads the firmware image 170 from the nonvolatile storage 180 to the volatile memory 190 to enable running the firmware 140 from the volatile memory 190; in other words, the node 105 may copy the firmware image 170 from the nonvolatile storage 180 to the installation location of the firmware 140 in the volatile memory 190. As described above, if the firmware 140 runs from volatile memory 190, as in this example, the firmware 140 was erased when the node 105 loses power, and thus, copying the firmware image 170 back to the volatile memory 190 enables the firmware 140 to run from its installation location. At block 440, also responsive to the reboot, the node 105 attempts to revalidate the firmware 140. For instance, as described above, the node 105 may hash the firmware 140 and compare the resulting hash to the verification data 160, specifically, to the signed validation hash 165 in the verification data 160.

It will be understood that block 435 and block 440 can be performed in the order described above, block 440 can be performed prior to block 435, or block 435 and block 440 can be performed in parallel. For instance, when block 435 is performed prior to block 440, such that the firmware 140 has been copied to the volatile memory 190 prior to validation, the node 105 may try to validate the firmware 140 based on the installed firmware 140 in the volatile memory 190. For instance, the node 105 may utilize dm-verity or a similar tool to load the firmware 140 and securely boot the node 105 based on validation of the firmware 140 with the verification data 160 during the boot process. However, when block 440 is performed prior to block 435, such that the firmware 140 has not been copied to the volatile memory 190 prior to the validation, the node 105 may attempt to validate the firmware 140 based on the firmware image 170 stored in the nonvolatile storage 180. For instance, the firmware image 170 may be hashed and the resulting hash compared to the verification data, specifically, for instance, to the signed validation hash 165 in the verification data.

In some implementations, although the package set 150 corresponding to the current version of the firmware 140 is stored on the node 105, the node 105 does not utilize the installation packages 155 during the reboot process or, more specifically, to reload the firmware 140 and validate the firmware 140. Rather, installation of each version of the firmware 140 based on the package set 150 need occur only a single time. After a power loss (e.g., during a reboot), the firmware 140 need not be reinstalled from the package set 150, due to having saved the firmware image 170 in the nonvolatile storage 180, thus enabling to the node 105 to copy that firmware image 170 back to the volatile memory 190 from which the firmware 140 runs. Typically, copying the firmware image 170 and validating the firmware 140 takes less time than installing the firmware 140 from the package set 150 would take. Thus, implementations described herein decrease the boot up time of the node 105.

As shown in FIG. 4, at decision block 445 of the method 400, the node 105 determines whether validation of the firmware 140 succeeds. If the validation succeeds (i.e., if the firmware was verified as authentic), then at block 450, the node 105 continues its boot process and the firmware 140 runs from the volatile memory 190.

However, if the validation fails, then the method 400 proceeds to block 455. In that case, the firmware 140 has been deemed unauthentic, which could mean potential corruption or malware, so the node 105 does not run the firmware 140 in some implementations. Although the boot process may be incomplete and the firmware 140 is not running, in some implementations, the node 105 has access to a set of services deemed critical or safe. For instance, the node 105 may be able to reinstall the firmware 140 from the package set 150 or to use at least one communication device (e.g., a radio) to contact the firmware update server 130. Thus, at block 455, the node 105 reinstalls the firmware 140 based on the package set 150 stored in the nonvolatile storage 180. At decision block 460, the node 105 then determines whether the firmware 140, as newly installed, is validatable. If the node 105 is able to validate the firmware 140, then the method 400 proceeds to block 450, where the node 105 completes the boot process and runs the firmware 140. However, if validation fails again, then at block 465, the node 105 performs further troubleshooting activities.

For instance, the node may attempt to validate the various installation packages 155 in the package set 150 to determine whether the problem is with an installation package 155. If validation succeeds (i.e., if all the installation packages are deemed authentic), then the node 105 sends an error notification. In that case, the installation packages 155 appear authentic, but the firmware 140 is invalid in some manner, and the node 105 is apparently unable to fix the problem with the firmware 140 by way of a new installation, which has already been attempted. However, if validation of the installation packages 155 fails, then the node 105 may seek one or more replacement installation packages 155 based on a determination that the problem lies with the installation packages 155. For instance, the node 105 may request, from the firmware update server 130 or from the provider server 110, a replacement for each installation package 155 whose validation failed, and the firmware update server 130 or the provider server 110 may send such replacement responsive to the request. If validation of an installation package 155 fails even after its replacement from the firmware update server 130, then the node may send a notification of an error.

Figure 5:
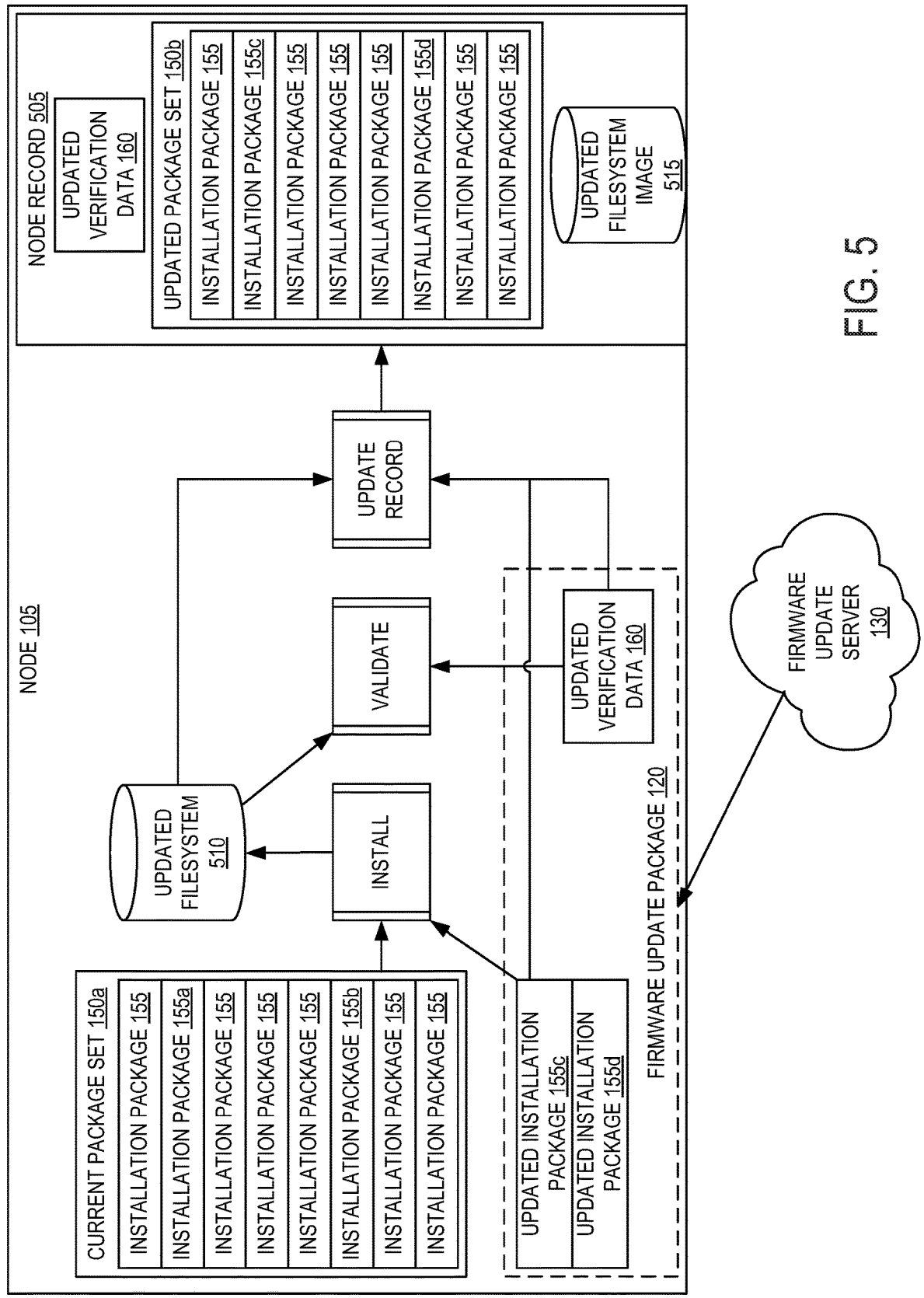
FIG. 5 depicts a communication flow of the node when installing the firmware based on an updated installation package in the firmware update package, according to some implementations described herein.

FIG. 5 depicts a communication flow of a node 105 when installing the firmware 140 based on an updated installation package 155, according to some implementations described herein. The description below follows this communication flow from left to right. Although the example of FIG. 5 illustrates that two installation packages 155c, 155d are being updated and that the firmware 140 being updated is a filesystem 510, it will be understood that these details are provided for illustrative purposes only. It will be understood that the firmware 140 need not be a filesystem 510 and that one or multiple installation packages 155 may be updated in a firmware update package 120 configured for updating the firmware 140.

As shown in FIG. 5, in some implementations, a node 105 maintains in its nonvolatile storage 180 a node record 505 including a current package set 150a corresponding to a current version of a filesystem 510 running from the volatile memory 190 of the node 105. In this example, the node 105 downloads from the firmware update server 130 a firmware update package 120 that includes updated installation packages 155c, 155d and verification data 160, such as a signed validation hash 165 and a respective signed package hash for validating each updated installation package 155c, 155d. The node 105 updates the current package set 150a stored in the node record 505 by inserting the updated installation packages 155c, 155d into the current package set 150a in place of the respective current installation packages 155a, 155b that are the respective current versions (i.e., being updated) of the updated installation packages 155c, 155d. The node 105 installs the updated filesystem 510 based on the updated package set 150b including the updated installation packages 155c, 155d and then validates the updated filesystem 510 with the verification data 160.

In this example, the node 105 initially maintains, in its node record 505 in nonvolatile storage 180, a current version (i.e., being updated) of a filesystem image 515 copied from the installed filesystem 510 prior to the update, a current package set 150a corresponding to the installed filesystem 510 prior to the update and thus configured to enable installation of the filesystem 510 as installed prior to the update, and verification data 160 for validating the current version of the filesystem 510 prior to the update. Given that the filesystem 510 has been updated, the node 105 may update this record 505 accordingly. Thus, to update the record 505, the node 105 may replace an existing signed validation hash 165 in the record with an signed validation hash 165 received in the firmware update package 120 and may replace an existing filesystem image 515 in the record 505 with an updated filesystem image 515 copied from the newly installed and thus newly updated filesystem 510. As described above, in some implementations, the signed validation hash 165 and the filesystem image 515 are maintained for use in reestablishing the filesystem 510 in the volatile memory 190 after the node 105 loses power, while the updated package set 150b is maintained for use during a future update to the filesystem 510 or to reinstall the filesystem 510 for troubleshooting or other purposes.

Figure 6:
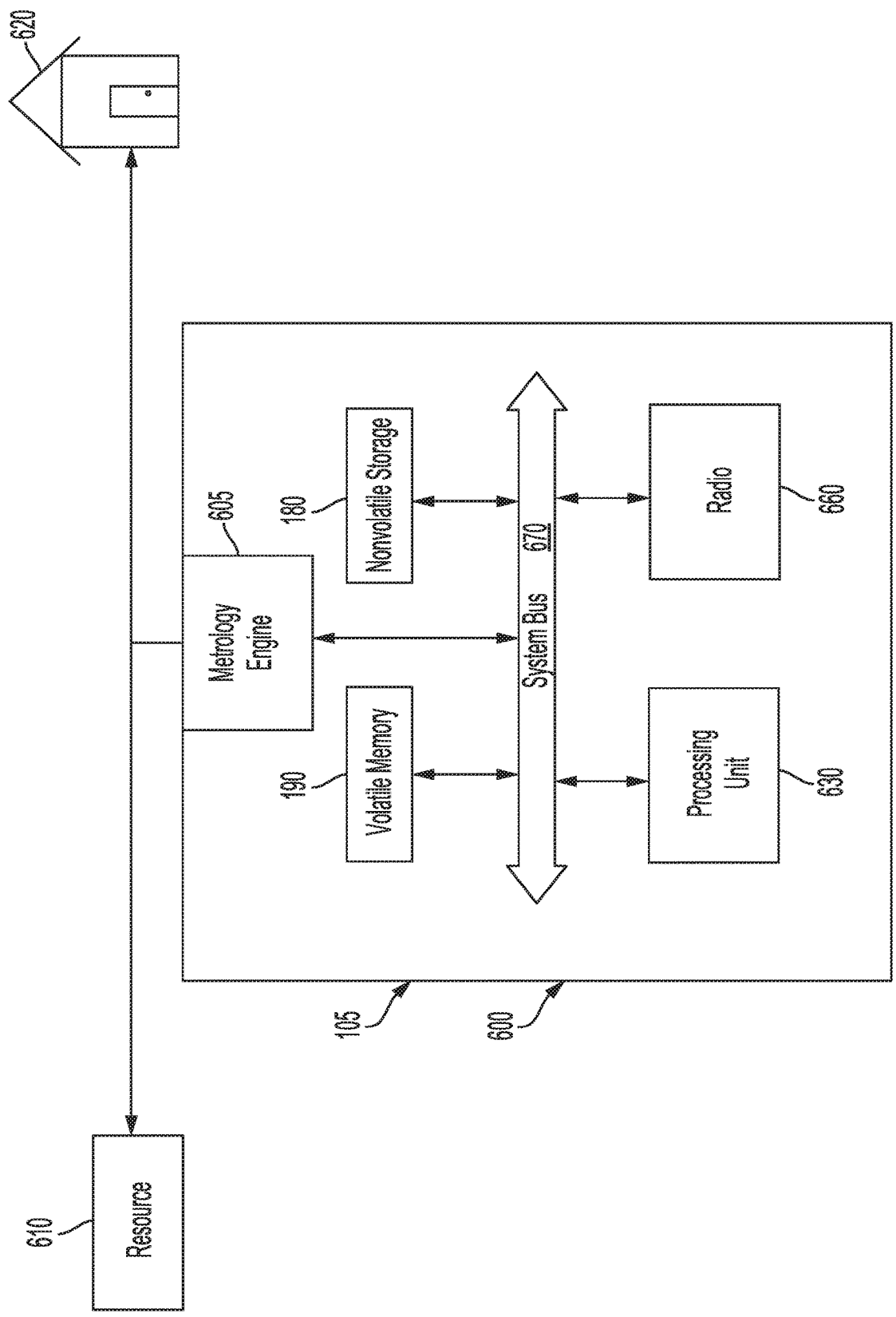
FIG. 6 depicts a diagram of a node, specifically a utility meter, according to some implementations described herein.

FIG. 6 depicts a diagram of a node 105, specifically a utility meter 600, according to some implementations described herein. For instance, the utility meter 600 may be a water meter, a gas meter, or another type of meter that measures consumption of a resource 610. A utility meter 600 such as that shown may act as a node 105 configured to install and utilize firmware 140 as described herein. More specifically, for instance, the firmware 140 may be a filesystem 510 of the utility meter 600. Although this disclosure refers to implementations described herein being embodied in a utility meter 600, it will be understood by one skilled in the art that implementations are not limited to utility meters 600. Rather, for instance, a node 105 may be a collector, a gateway, or another computing device other than a utility meter 600.

As shown in FIG. 6, an example utility meter 600 measures consumption of a resource 610 occurring on a premises 620. To this end, the utility meter 600 may include a metrology engine 605, which detects a signal indicating use of the resource 610 and, based on that signal, determines use of the resource 610 on the premises 620. The utility meter 600 may further include a processing unit 630, a volatile memory 190, a nonvolatile storage 180, and a communication device such as a radio 660. For instance, the utility meter 600 may use the radio 660 to download a firmware update package 120 from the firmware update server 130 or from the provider server 110 as described herein. The processing unit 630, the volatile memory 190, the nonvolatile storage 180, and the radio 660 may be in communication with one another and with the metrology engine 605 by way of a system bus 670. Although the processing unit 630, the volatile memory 190, and the nonvolatile storage 180 are shown and described herein as being distinct components, it will be understood that this distinction is for illustrative purposes only and does not limit the scope of this disclosure. For instance, the processing unit 630, the volatile memory 190, and the nonvolatile storage 180 may be integrated together into a single chip, such as a microcontroller unit.

In some implementations, the operations of a node 105 described herein, such as installing firmware 140, validating firmware 140, and running firmware 140, are embodied as program instructions stored in a computer-readable medium, such as the nonvolatile storage 180 or the volatile memory 190 of the utility meter 600. In some implementations, the computer-readable medium is a non-transitory computer-readable medium. The processing unit 630 may execute the program instructions to implement operations as described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for updating firmware, the method comprising:
  receiving, at a device, an updated installation package comprising an updated version of an installation package, the installation package belonging to a set of installation packages stored on the device for installation of firmware on the device;
  updating the set of installation packages to an updated set of installation packages by replacing, in the set of installation packages stored on the device, the installation package with the updated installation package, wherein the updated set of installation packages are together configured to install updated firmware;
  installing the updated firmware in a volatile memory of the device based on the updated set of installation packages including the updated installation package;
  receiving, at the device, a signed validation hash of an authentic version of the updated firmware as installed;
  generating a hash of the updated firmware as installed on the device;
  confirming that the hash matches the signed validation hash of the authentic version of the updated firmware;
  storing an image of the updated firmware in a nonvolatile storage of the device; and
  during a boot of the device:
    loading a firmware image from the nonvolatile storage of the device onto the volatile memory of the device to enable running current firmware from the volatile memory;
    hashing the current firmware to generate a current hash; and
    attempting to verify authenticity of the current firmware by checking that the current hash of the current firmware matches the signed validation hash of the authentic version of the updated firmware.

2. The method of claim 1, further comprising:
  receiving a signed package hash associated with the updated installation package;
  applying a hash function to the updated installation package to generate a current package hash; and
  confirming that the current package hash matches the signed package hash to verify authenticity of the updated installation package, prior to installing the updated firmware in the volatile memory of the device.

3. The method of claim 1, further comprising:
  detecting that the current hash is not equal to the signed validation hash; and
  requesting from a remote server a replacement for one or more installation packages in the updated set of installation packages, based on the current hash not being equal to the signed validation hash.

4. The method of claim 1, wherein the updated set of installation packages comprises a plurality of installation packages, and wherein the updated installation package is a proper subset of the updated set of installation packages.

5. The method of claim 1, wherein the updated firmware is a filesystem.

6. The method of claim 5, wherein the device is a utility meter and the updated installation package is received via a wireless network.

7. The method of claim 1, further comprising running the current firmware from the volatile memory, responsive to confirming that the current hash of the current firmware matches the signed validation hash of the authentic version of the updated firmware.

8. A system comprising a server, the server comprising:
  a server processor configured to execute computer-readable instructions;
  a server memory configured to store the computer-readable instructions that, when executed by the server processor, cause the server processor to perform operations comprising:
    identifying an updated installation package;
    updating a set of installation packages to an updated set of installation packages by inserting the updated installation package into the set of installation packages to replace an existing version of the updated installation package, wherein the updated installation package is a proper subset of the updated set of installation packages;
    installing the updated set of installation packages, including the updated installation package, to generate an authentic version of updated firmware;
    generating a signed validation hash of the authentic version of the updated firmware as installed; and
    providing the updated installation package and the signed validation hash to one or more nodes remote from the server;
    wherein the one or more nodes utilize the updated installation package to update their respective firmware, and wherein the one or more nodes utilize the signed validation hash to verify authenticity of their respective firmware; and
  one node of the one or more nodes comprising a node processor configured to execute computer-readable instructions to perform operations of the one node, the operations of the one node comprising:
    receiving the updated installation package;
    receiving the signed validation hash of the authentic version of the updated firmware as installed;
    updating a local set of installation packages stored on the one node to an updated local set of installation packages by replacing, in the local set of installation packages, the existing version of the updated installation package with the updated installation package, wherein the updated local set of installation packages are together configured to install the updated firmware;
    installing the updated firmware in a volatile memory of the one node, based on the updated local set of installation packages including the updated installation package, to enable running the updated firmware from the volatile memory;
    generating a hash of the updated firmware as installed on the one node; and verifying authenticity of the updated firmware by comparing the hash to the signed validation hash of the authentic version of the updated firmware.

9. The system of claim 8, the operations of the one node further comprising:
storing an image of the updated firmware in a nonvolatile storage of the one node; and
during a boot of the one node:
loading a firmware image from the nonvolatile storage of the one node onto the volatile memory of the one node to enable running current firmware from the volatile memory;
hashing the current firmware to generate a current hash; and
attempting to verify the authenticity of the current firmware by checking that the current hash of the current firmware matches the signed validation hash of the authentic version of the updated firmware.

10. The system of claim 9, wherein attempting to verify the authenticity of the current firmware comprises detecting that the current hash of the current firmware is not equal to the signed validation hash, and the operations of the one node further comprising:
requesting from the server a replacement for one or more installation packages in the updated local set of installation packages, based on the current hash of the current firmware not being equal to the signed validation hash.

11. The system of claim 8, wherein the updated local set of installation packages comprises a plurality of installation packages, and wherein the updated installation package is a proper subset of the updated local set of installation packages.

12. The system of claim 8, wherein the one node is a utility meter.

13. The system of claim 12, wherein the updated firmware is a filesystem for the utility meter.

14. A method for updating a filesystem, the method comprising:
receiving, at a device, an updated installation package comprising an updated version of an installation package, the installation package belonging to a set of installation packages stored on the device for installation of a filesystem on the device;
updating the set of installation packages to an updated set of installation packages by replacing, in the set of installation packages stored on the device, the installation package with the updated installation package, wherein the updated set of installation packages are together configured to install an updated filesystem;
installing the updated filesystem in a volatile memory of the device based on the updated set of installation packages including the updated installation package;
receiving, at the device, a signed validation hash of an authentic version of the updated filesystem;
generating a hash of the updated filesystem as installed on the device;
validating the updated filesystem by comparing the hash of the updated filesystem to the signed validation hash of the authentic version of the updated filesystem;
storing an image of the updated filesystem in a nonvolatile storage of the device; and
during a boot of the device:
loading a filesystem image from the nonvolatile storage of the device onto the volatile memory of the device to enable running a current filesystem from the volatile memory;
hashing the current filesystem to generate a current hash; and
attempting to validate the current filesystem by comparing the current hash of the current filesystem to the signed validation hash of the authentic version of the updated filesystem.

15. The method of claim 14, further comprising:
receiving a signed package hash associated with the updated installation package;
applying a hash function to the updated installation package to generate a current package hash; and
confirming that the current package hash matches the signed package hash to verify authenticity of the updated installation package, prior to installing the updated filesystem in the volatile memory of the device.

16. The method of claim 14, further comprising:
detecting that the current hash of the current filesystem is not equal to the signed validation hash of the authentic version of the updated filesystem; and
requesting from a remote server a replacement for one or more installation packages in the updated set of installation packages, based on the current hash not being equal to the signed validation hash.

17. The method of claim 14, wherein hashing the current filesystem to generate the current hash occurs subsequent to loading the image of the updated filesystem from the nonvolatile storage of the device onto the volatile memory of the device.

18. The method of claim 14, wherein hashing the current filesystem to generate the current hash occurs prior to loading the image of the updated filesystem from the nonvolatile storage of the device onto the volatile memory of the device.

19. The method of claim 14, wherein receiving the updated installation package comprises downloading the updated installation package over a wireless mesh network.

* * * * *